(No Model.)

F. E. BRIGHTMAN.
FRICTIONAL AND POSITIVE CLUTCH.

No. 516,640. Patented Mar. 20, 1894.

WITNESSES:
Frank H. Hundt
J. J. Buitinger

INVENTOR
Frank E. Brightman
BY Geo. W. King
ATTORNEY.

UNITED STATES PATENT OFFICE.

FRANK E. BRIGHTMAN, OF CLEVELAND, OHIO.

FRICTIONAL AND POSITIVE CLUTCH.

SPECIFICATION forming part of Letters Patent No. 516,640, dated March 20, 1894.

Application filed May 1, 1893. Serial No. 472,624. (No model.)

*To all whom it may concern:*

Be it known that I, FRANK E. BRIGHTMAN, of Cleveland, in the county of Cuyahoga and State of Ohio, have invented certain new and useful Improvements in a Combined Positive and Friction Clutch; and I do hereby declare the following to be a full, clear, and exact description of the invention, such as will enable others skilled in the art to which it pertains to make and use the same.

My invention relates to combined friction and positive clutches, the latter being of the so-called crab variety, the two clutches being so arranged and operated by a single hand lever, that in opening, or rendering inoperative the friction clutch, the positive clutch is thereby closed, or rendered operative, and vice versa; whereby the friction clutch may be used in starting and stopping machinery or shafting, and after such machinery or shafting has been set in motion, the positive clutch is used for driving the same while at work, and while the positive clutch is operative, the friction clutch meantime remains inoperative, and consequently not subject to wear.

My invention also relates to the details of construction hereinafter described and pointed out in the claims.

Figure 1:
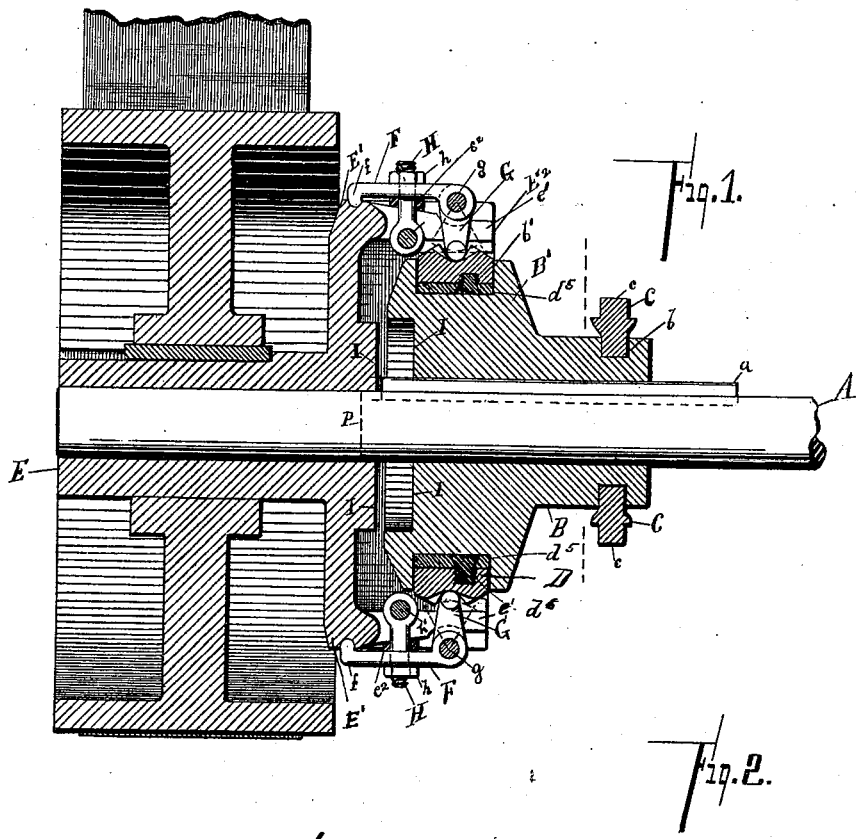
Figure 2:
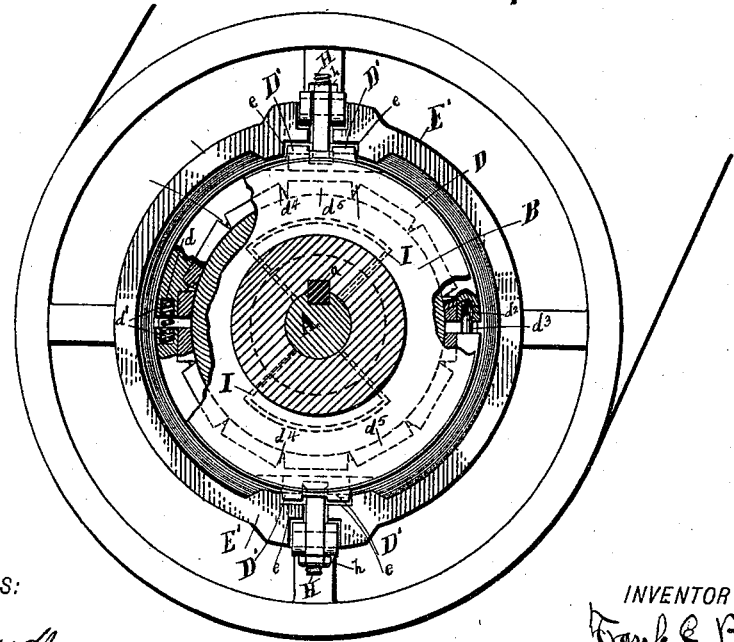

In the accompanying drawings, Figure 1 is a horizontal central section of a device embodying my invention. Fig. 2 is an end elevation, partly in section.

A, represents a driving shaft on which is mounted sleeve B, this sleeve having an easy fit so that it may slide endwise on the shaft, but by reason of spline $a$, the shaft and sleeve B, must revolve in unison. Sleeve B, has a circumferential groove $b$, that is engaged by collar C, this collar having trunnions $c$, for engaging the prongs of a hand lever (not shown) by means of which sleeve B, is moved endwise on the shaft. Sleeve B, has an external annular flange B', this flange having a peripheral groove $b'$, in which operates the friction band D, this band being constructed usually in halves, although the friction band might be constructed in three or more sections if so desired, as will be hereinafter mentioned. The opposing ends of the friction band sections are correspondingly bored a short distance as at $d$, to receive respectively, stiff coiled springs $d'$. In closing the friction band, springs $d'$, are compressed, and when the pressure applied by the toggles in closing the friction band is removed, the recoil of springs $d'$, force apart the friction band sections so that they do not ride on the friction disk B'. On either side of each bore $d$, are holes $d^2$, for inserting dowel pins $d^3$, to hold the opposite ends of the friction band sections in place, relative to each other. The friction band has a series of internal transverse ribs $d^4$, and between these ribs are inserted blocks of wood as at $d^5$ to constitute a wooden friction lining. These blocks are secured by driving fits, although they may also be further secured, for instance by screws as at $d^6$, Fig. 1, but usually these screws will not be needed. After the blocks $d^5$, are inserted, the wooden face thus provided is bored to fit the friction disk.

E, is a sleeve mounted on the shaft, this sleeve having an external flange E'. This flange is integral with the overhanging rim $E^2$. At the circumferential center of each friction band section is provided a boss D', and these bosses respectively fit easily in the internal depressions $e$, of the overhanging rim E', by reason of which rim E', and the friction band must revolve together.

F, F, are levers extending approximately horizontal in the direction of the shaft. The one end of each lever has a rib or toe, as at $f$, and this rib or toe fits in a corresponding depression in member E', to hold the levers in position endwise. To the other end of each lever F, is pivoted as at $g$, a toggle G, the free end of the toggle engaging the opposing friction band section. These toggles operate in slots $e'$, of rim E', these slots being constructed for the purpose.

H, H, are eye bolts that extend loosely through holes in rim E', and through holes in the respective levers F, each eye bolt having a nut $h$, engaging the outer face of the opposing lever F. Each eyebolt has a lateral pin $h'$, these pins engaging the inner surface of rim $E^2$. Between rim $E^2$, and each lever F, is a rubber block $e^2$. In screwing down nuts $h$, blocks $e^2$, are more or less compressed, and as between an elastic block $e^2$, and the opposing nut $h$, the engaged lever is held from rattling when the toggles are inoperative. When members E E', are in such position that toggles G, are perpendicular to the friction band, in such position the toggles exert their maximum force in closing the friction band upon the friction disk. When members E E', are backed toward the right hand (relating to Fig. 1), until the toggles assume the inclined position shown in dotted lines, the toggles release the friction band, whereupon, the recoil of springs $d^2$, open the band so that it does not press upon the friction disk. The opposing ends of sleeves B and E, have jaws for mutual engagement as at I I, so that when these jaws are interlocked they constitute a positive clutch, usually known as a crab clutch. While the toggles are in their perpendicular position as aforesaid, the jaws of the two sleeves do not engage each other, but if sleeve B, be moved toward the left to incline the toggles so as to render the toggles inoperative, such movement toward the left hand would close the positive clutch, and, at the same time would release the friction clutch, and a reverse movement of sleeve B, would open the positive clutch and close the friction clutch, and a further movement of sleeve B, toward the right hand, would again open the friction clutch. Now if a band wheel were mounted on and keyed fast to sleeve E, it is evident that this band wheel could be operated by the clutches.

It is customary in shutting down a factory to throw the driving belts of the different machines onto the loose pulleys, so that the machines stop before the engine is shut down, and consequently when the engine is again started, it has, at first, only to start the idle shafting and loose pulleys and after the engine is in full motion, the different machines are started as they are wanted. It will therefore be readily understood, that a friction clutch that might be of ample force to start the idle shafting, might be quite inadequate to drive the machinery of the factory for working purposes. With my improved device, as the friction clutch is supposed only to set the idle shafting or pulley in motion, a comparatively light friction clutch will answer the purpose, and as the friction clutch ordinarily is only used for a few moments at a time, it is therefore durable, and by reason of the removable wooden friction face of the friction band, this part is cheaply renewed.

In case the shaft is in two pieces, with the division at dotted line P, in that case sleeve E is keyed to the left-hand section, and this, the left hand section, and whatever may be mounted thereon, is, in such case driven by the clutches in the manner aforesaid.

I will call attention to what is believed to be a novel feature of my device, to wit: If in starting up the friction clutch it is found that it has not sufficient power, by backing sleeve B, and then tightening nuts, $h$, any desired additional pressure may be applied by means of the toggles, to the friction band, and this too without stopping the engine or other motor.

I do not wish to limit myself to a friction band constructed in two sections. More especially where the friction band is of large diameter I consider it good practice to construct the band in three or more sections; and this would of course necessitate a toggle for each section thereof.

What I claim is—

1. The combination in a clutch, of opposing sleeves mounted on a shaft, the one sleeve having a friction disk, and a friction band encircling said disk, the other sleeve having a flange, toggles secured to said flange and acting on the friction band in order to apply or release the same when the one sleeve is moved endwise, substantially as specified.

2. In combination with a pair of sleeves mounted on a shaft, the one sleeve having a friction disk, a friction band encircling said disk for engaging the same, dowel pins and springs for connecting said friction bands; the other sleeve having a flange, toggles pivoted to said flange, and arranged to operate against the friction band, substantially as described and for the purpose set forth.

3. In combination, the shaft, sleeves mounted thereon, the one sleeve having a friction disk and collar, a sectional friction band encircling said disk and provided with wooden blocks secured to the inner face thereof; the other sleeve provided with an overhanging rim, toggles pivoted to said rim and arranged to operate the said friction disk, and levers extending in the direction of the shaft and adapted to a depression in the said rim, all substantially as specified.

4. In combination, a shaft with opposing sleeves mounted thereon, the one sleeve having a friction disk, a sectional friction band thereon, and bosses at or near the center of each section of said band; the other sleeve having a disk, overhanging rim integral with the disk, recesses in said rim for receiving the bosses, and toggles arranged to operate the friction band by moving the friction disk endwise, all substantially as specified.

5. In combination, a shaft with opposing sleeves mounted thereon, the one sleeve having a friction disk, and a friction band encircling said disk; the other sleeve having a slotted rim, levers pivoted to said rim and provided with a rib, toggles pivoted to the levers and working in the slotted rim, and eye-bolts passing through the levers and arranged to adjust the latter in order to regulate the pressure on the friction band, substantially as described.

6. In combination, a pair of sleeves mounted on a shaft, the opposing end of each sleeve having jaws to interlock, the one sleeve having a friction disk, and a sectional friction band encircling said disk; the other sleeve having a slotted projecting rim, levers pivoted to said rim, depressions in the rim to receive the ribbed portion of the levers, and toggles pivoted to said levers for operating the friction band, all substantially as set forth and described.

7. In combination, a shaft, sleeves mounted thereon, the one sleeve having a friction disk, a friction band encircling said disk; the other sleeve having an overhanging slotted rim, levers pivoted to said rim, the ends of which are provided with a rib adapted to depressions in the rim, bolts for adjusting the levers, and toggles working in the slotted rim and adapted to operate the friction band, all substantially as described and for the purpose set forth.

In testimony whereof I sign this specification, in the presence of two witnesses, this 20th day of April, 1893.

FRANK E. BRIGHTMAN.

Witnesses:
 FRANK C. GREGG,
 J. T. MCANNICH.